United States Patent
Salit et al.

(10) Patent No.: US 9,733,084 B2
(45) Date of Patent: Aug. 15, 2017

(54) SINGLE PUMP CASCADED STIMULATED BRILLOUIN SCATTERING (SBS) RING LASER GYRO

(71) Applicant: Honeywell International Inc., Morris Plains, NJ (US)

(72) Inventors: Mary K. Salit, Plymouth, MN (US); Jianfeng Wu, Tucson, AZ (US); Tiequn Qiu, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 119 days.

(21) Appl. No.: 14/882,101

(22) Filed: Oct. 13, 2015

(65) Prior Publication Data

US 2017/0067743 A1    Mar. 9, 2017

Related U.S. Application Data (60) Provisional application No. 62/216,203, filed on Sep. 9, 2015.

(51) Int. Cl.
    *G01C 19/66* (2006.01)

(52) U.S. Cl.
    CPC .......... *G01C 19/661* (2013.01); *G01C 19/66* (2013.01)

(58) Field of Classification Search
    CPC ..... G01C 19/661; G01C 19/66; G01C 19/723
    See application file for complete search history.

(56) References Cited

U.S. PATENT DOCUMENTS

| | | | |
|---|---|---|---|
| 4,159,178 A | 6/1979 | Vali et al. | |
| 4,396,290 A | 8/1983 | Morris | |
| 4,530,097 A | 7/1985 | Stokes et al. | |
| 4,863,272 A | 9/1989 | Coccoli | |
| 5,064,288 A | 11/1991 | Dyes et al. | |
| 5,323,415 A | 6/1994 | Quast et al. | |

(Continued)

FOREIGN PATENT DOCUMENTS

EP    2741050    11/2014

OTHER PUBLICATIONS

European Patent Office, "Office Action from EP Application No. 13191290.9 mailed Feb. 21, 2014", "from Foreign Counterpart of U.S. Appl. No. 13/693,321", Feb. 21, 2014, pp. 1-6, Published in: EP.

(Continued)

*Primary Examiner* — Hwa Lee
(74) *Attorney, Agent, or Firm* — Fogg & Powers LLC (57) ABSTRACT

A ring laser gyroscope is provided. The ring laser gyroscope includes an optical ring resonator, an optical source to provide a pump beam at a pump frequency, a beat detector, and an optical clock detector. The pump beam is coupled to the optical ring resonator in the first direction and stimulates a first optical gain curve at a first stokes wave frequency downshifted by a Brillouin stokes frequency from the pump frequency. A first order stimulated Brillouin scattering (SBS) beam propagates in the second direction and a second order SBS beam propagates in the first direction. The beat detector produces an optical beat signal that varies as a function of a frequency difference between the first order SBS beam and the second order SBS beam. The optical clock detector generates a reference frequency signal based on two co-propagating beams.

20 Claims, 8 Drawing Sheets

(56) References Cited

U.S. PATENT DOCUMENTS

| | | | |
|---|---|---|---|
| 5,351,252 | A | 9/1994 | Toyama et al. |
| 5,406,370 | A | 4/1995 | Huang et al. |
| 5,408,317 | A | 4/1995 | Dyes et al. |
| 5,517,305 | A | 5/1996 | Raab |
| 5,537,671 | A | 7/1996 | Toyama |
| 6,424,664 | B1 | 7/2002 | Oh et al. |
| 7,024,069 | B2 | 4/2006 | Savchenkov et al. |
| 7,065,276 | B2 | 6/2006 | Scheuer et al. |
| 7,184,624 | B1 | 2/2007 | Matsko et al. |
| 7,372,574 | B2 | 5/2008 | Sanders et al. |
| 7,463,360 | B2 | 12/2008 | Hughes et al. |
| 8,289,616 | B1 | 10/2012 | Maleki et al. |
| 8,659,760 | B2 | 2/2014 | Sanders et al. |
| 8,830,478 | B2 | 9/2014 | Wu et al. |
| 9,581,448 | B2 * | 2/2017 | Christensen .......... G01P 15/093 |
| 2011/0255094 | A1 | 10/2011 | Mohageg et al. |
| 2012/0189025 | A1 | 7/2012 | Zheng et al. |
| 2014/0152994 | A1 | 6/2014 | Wu et al. |
| 2016/0204571 | A1 | 7/2016 | Wu et al. |

OTHER PUBLICATIONS

Abd-Rahman et al., "Multiwavelength, bidirectional operation of twin-cavity Brillouin/erbium fiber laser", "Optics Communications 181", Jul. 1, 2000, pp. 135-139, Publisher: Elsevier Science B.V.

Chen, Shiyi, "Stimulated Brillouin Scattering in an On-Chip Microdisk Resonator—Abstract", Dec. 2014, Publisher: University of Illinois at Urbana-Champaign.

Hitz, "Silicon Raman Laser Cascades Toward Mid-IR Spectral Region", "Nature Photonics", Mar. 2008, pp. 170-174.

Kim et al., "Non-reciprocal Brillouin Scattering Induced Transparency", "Nature Physics", Jan. 26, 2015, pp. 275-280, vol. 11.

Li et al., "Microresonator Brillouin Gyroscope", "Optical Society of America", 2015, pp. 1-2.

Matsko et al., "Optical resonators with whispering gallery modes I: Basics", "IEEE JSTQE", Jan.-Feb., 2006, pp. 3-14, vol. 12, No. 1.

Pant et al., "On-Chip Stimulated Brillouin Scattering", "Optics Express", Apr. 25, 2011, pp. 8285-8290, vol. 19, No. 9.

Pant et al., "On-chip Stimulated Brillouin Scattering for Microwave Signal Processing and Generation", "Laser & Photonics Reviews", 2014, pp. 653-666, vol. 8, No. 5.

Takesue et al., "An On-Chip Coupled Resonator Optical Waveguide Single-Photon Buffer", "Nature Communications", Nov. 12, 2013, pp. 1-11.

Wu et al., "Systems and Methods for an Optical Frequency Comb Stimulated Brillouin Scattering Gyroscope With Rigid Optical Waveguide Resonator", "U.S. Appl. No. 14/680,331, filed Apr. 7, 2015", Apr. 7, 2015.

Zarinetchi et al., "Stimulated Brillouin fiber-optic laser gyroscope", "Optics Letters", Feb. 15, 1991, pp. 229-231, vol. 16, No. 4, Publisher: Optical Society of America, Published in: New York, NY.

Slagmolen, "Phase-Sensitive Reflection Technique for Characterization of a Fabry-Perot Interferometer", "Applied Optics", Jul. 20, 2000, pp. 3638-3643, vol. 39, No. 21, Publisher: Optical Society of America.

Yariv, "Critical Coupling and Its Control in Optical Waveguide-Ring Resonator Systems", "IEEE Photonics Technology Letters, Apr. 2002", , pp. 483-485, vol. 14, No. 4.

U.S. Patent and Trademark Office, "Office Action", "from U.S. Appl. No. 14/680,331 mailed Sep. 7, 2016", Sep. 7, 2016, pp. 1-29, Published in: US.

European Patent Office, "Extended Search Report for EP Application No. 16187068.8", "Foreign Counterpart to U.S. Appl. No. 14/882,101", Nov. 23, 2017, pp. 1-8, Published in: US.

Nicati et al., "Frequency Stability of a Brillouin Fiber Ring Laser", "Journal of Lightwave Technology", Jul. 1, 1995, pp. 1445-1451, vol. 13, No. 7, Published in: US.

European Patent Office, "Extended European Search Report from EP Application No. 16150483.2 mailed Jun. 23, 2016", "from Foreign Counterpart of U.S. Appl. No. 14/680,331", Jun. 23, 2016, pp. 112, Published in: EP.

Eggleton et al., "Inducing and harnessing stimulated Brillouin scattering in photonic integrated circuits", Dec. 19, 2013, pp. 1-52, Publisher: Advances in Optics and Photonics.

\* cited by examiner

SINGLE PUMP CASCADED STIMULATED BRILLOUIN SCATTERING (SBS) RING LASER GYRO

This patent application claims priority to U.S. Provisional Patent Application No. 62/216,203, entitled "SINGLE-PUMP CASCADED STIMULATED BRILLOUIN SCATTERING (SBS) RING LASER GYRO" filed Sep. 9, 2015, which is hereby fully incorporated herein by reference.

BACKGROUND

There is a need for low cost, high performance gyroscopes for navigation systems, precision point systems, and guidance systems. The navigation-grade gyro market has historically favored HeNe ring laser gyroscopes (RLGs) such as the GG1320, but thermally extreme, high shock, and high vibration applications in GPS-denied missions require a new look at the trade space. In conventional RLGs, a "dither motor" is required to prevent resonance frequencies from becoming degenerate at small rates; and the dither motor requires fragile moving parts, which are unsuitable for high shock and vibration applications. The monolithic integration of optical waveguides on a single silicon substrate with no moving parts offers an advantage in demanding environments.

SUMMARY

The present application relates to ring laser gyroscope. The ring laser gyroscope includes an optical ring resonator configured to propagate optical beams in a first direction and a second direction. The second direction is opposite the first direction. The optical ring resonator includes at least one optical coupling region to couple optical beams into and out of the optical ring resonator. The ring laser gyroscope also includes an optical source to provide a pump beam at a pump frequency. The pump beam is optically coupled to the optical ring resonator in the first direction. The pump beam stimulates a first optical gain curve at a first stokes wave frequency downshifted by a Brillouin stokes frequency from the pump frequency. The optical ring resonator has a resonator mode within a bandwidth of the first optical gain curve and the resonator round-trip loss is less than the first optical gain, so that a first order stimulated Brillouin scattering (SBS) beam propagates in the second direction. The first order SBS beam stimulates a second optical gain curve at a second stokes wave frequency downshifted by twice the Brillouin Stokes frequency from the pump frequency. The optical ring resonator has a resonator mode within the bandwidth of the second optical gain curve. The resonator round-trip loss is less than a second optical gain, so that a second order SBS beam propagates in the first direction. The ring laser gyroscope also includes a beat detector configured to produce an optical beat signal that varies as a function of a frequency difference between the first order SBS beam and the second order SBS beam; and an optical clock detector to generate a reference frequency signal based on two co-propagating beams.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The systems and methods described herein take advantage of the properties of stimulated Brillouin scattering (SBS) by generating second order stimulated Brillouin scattered light from first order stimulated Brillouin scattered light to create, from a single pump laser, two optical beams propagating in opposite directions at different known frequencies.

Figure 1:
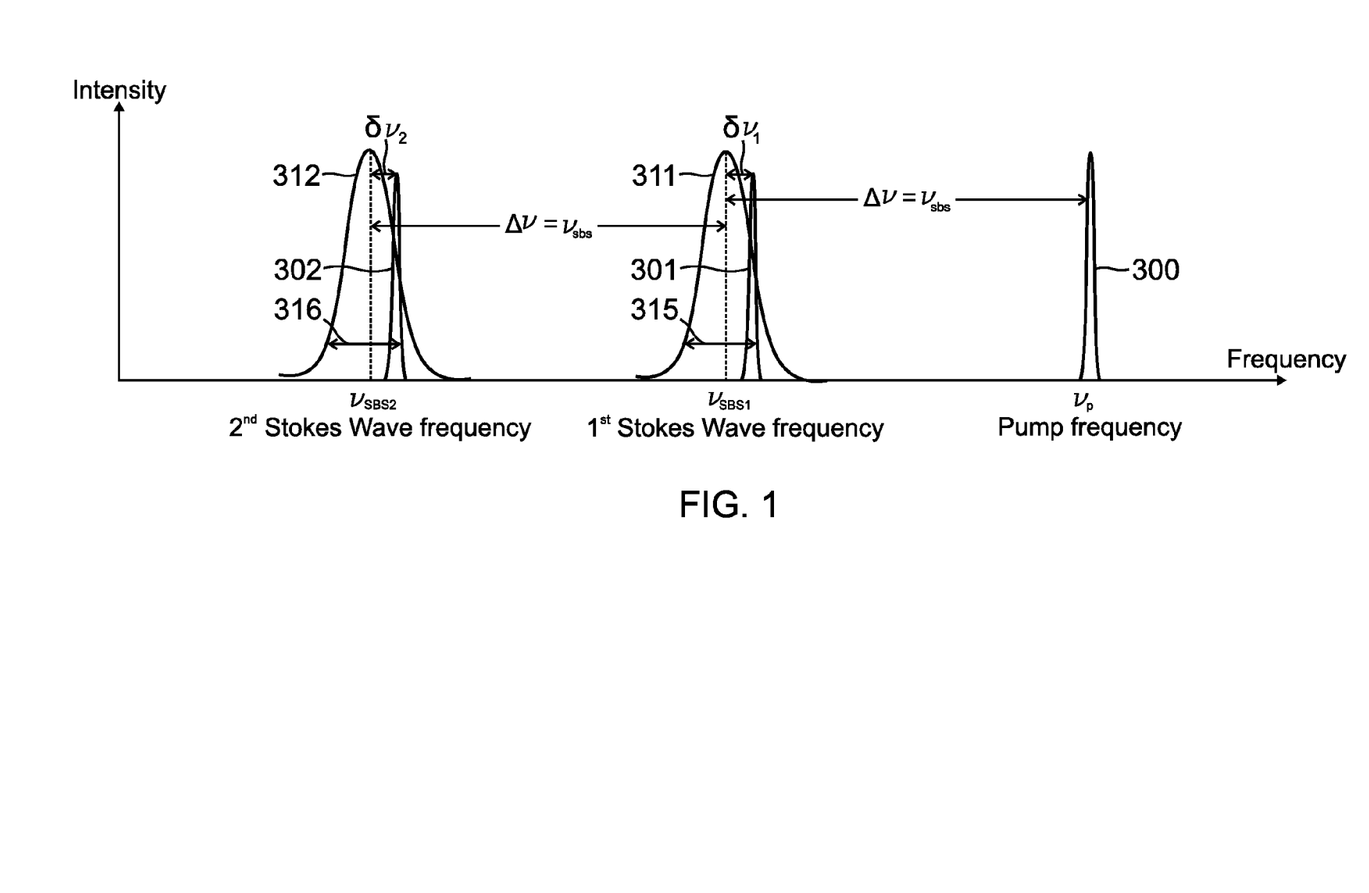
FIG. 1 shows the frequency distribution of an optical pump beam, a first order stimulated Brillouin scattering (SBS) beam, and a second order SBS beam in accordance with the present application.
Figure 2:
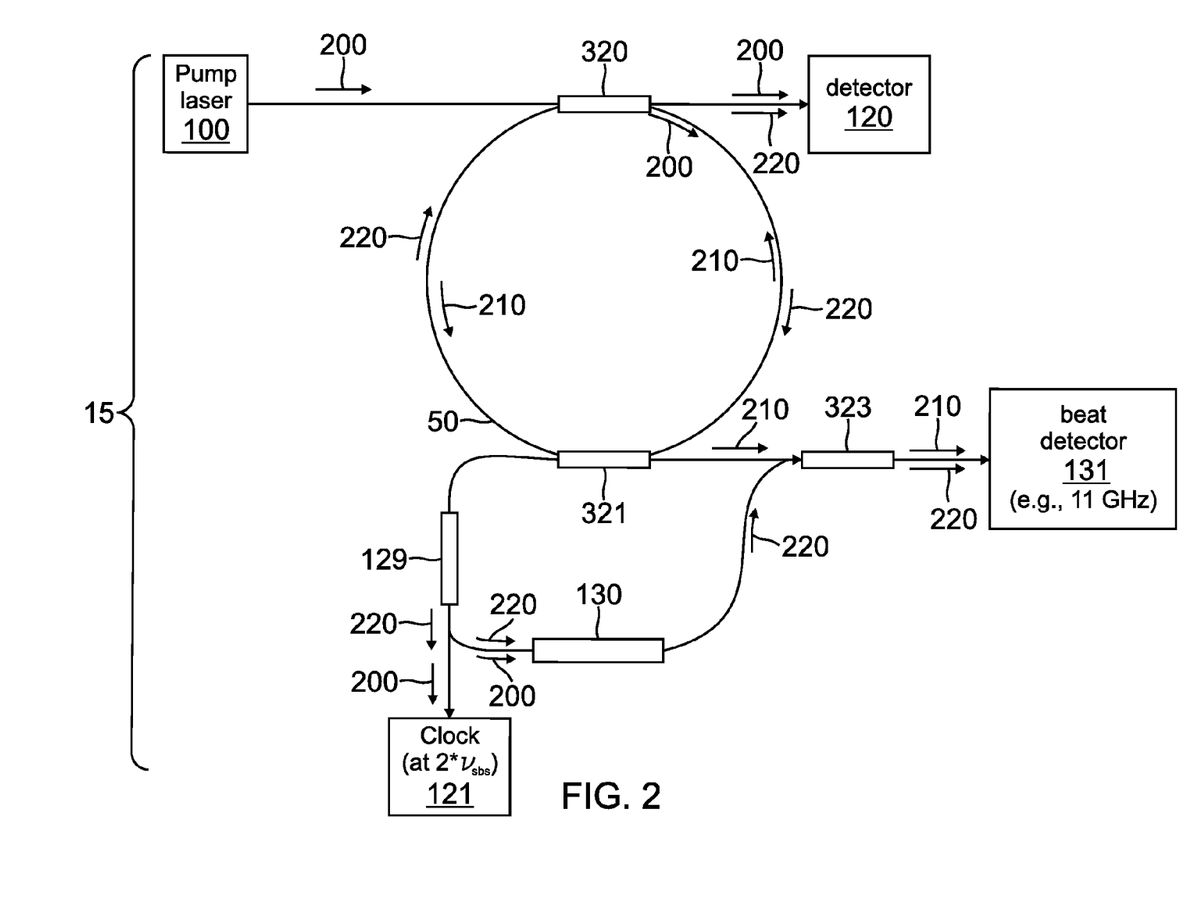
FIG. 2 shows a portion of an embodiment of a ring laser gyroscope in which an optical pump beam, a first order SBS beam, and a second order SBS beam propagate in an optical ring resonator in accordance with the present application.

FIG. 1 shows the frequency distribution of an optical pump beam, a first order stimulated Brillouin scattering (SBS) beam, and a second order SBS beam in accordance with the present application. FIG. 2 shows a ring-laser-gyroscope portion 15 of an embodiment of a SBS ring laser gyroscope (RLG) in which an optical pump beam 200, a first order SBS beam 210, and a second order SBS beam 220 propagate in an optical ring resonator 50 in accordance with the present application. The optical ring resonator 50 is also referred to herein as optical resonator 50.

The optical pump beam 200 is at a pump frequency $v_p$ (FIG. 1) and propagates in a first direction. The first order SBS beam is at a first Stokes wave frequency $v_{SBS1}$ (FIG. 1) and propagates in a second direction opposite the first direction of propagation of the pump beam 200. The second order SBS beam is at a second Stokes wave frequency $v_{SBS2}$ (FIG. 1) and co-propagates with the optical pump beam 200 in the first direction. In this exemplary case, the first direction is the clockwise (CW) direction and the second direction is the counter-clockwise (CCW) direction. The optical ring resonators in the embodiments of ring laser gyroscopes described herein resonate at the pump frequency $v_p$, the first Stokes wave frequency $v_{SBS1}$, and the second Stokes wave frequency $v_{SBS2}$.

As shown in FIG. 2, the ring-laser-gyroscope portion 15 optical pump beam 200 is emitted from an optical source 100 (pump laser 100). In this embodiment of the ring-laser-gyroscope portion 15 the optical ring resonator 50 has a first optical coupling region 320 and a second optical coupling region 321. In other embodiments, described below with reference to FIGS. 5A, 5B, and 6, the optical ring resonator has a single optical coupling region. The optical coupling regions are a directional coupler. One skilled in the art understands how to design and fabricate these types of optical coupling regions. Other types of optical coupling regions in an optical ring resonator, including future developed optical couplers, are possible.

In one implementation of this embodiment, the optical ring resonator 50 is a rigid optical waveguide resonator 50. The rigid optical waveguide resonator 50 can be formed in a semiconductor material, glass, or plastic. The rigid optical waveguide resonator 50 can be formed by etching the waveguide into a substrate, etching the waveguide into one or more layers deposited on the substrate, or etching the waveguide into a portion of a substrate (i.e., a chip). As known to one skilled in the art, the etching of the chip may be followed by deposition of one or more layers of material and one or more additional etching processes to ensure the waveguide is a low loss waveguide.

In another implementation of this embodiment, the optical ring resonator 50 is an optical fiber resonator 50 formed from an optical fiber.

As the optical pump beam 200 propagates through the optical ring resonator 50, a first optical gain curve 311 (FIG. 1) is stimulated by the optical pump beam 200 at a first Stokes wave frequency $v_{SBS1}$ that is downshifted by a Brillouin Stokes frequency $v_{sbs}$ from the pump frequency $v_p$. As shown in FIG. 1, the optical ring resonator 50 has a resonator mode 301 within the bandwidth 315 of the first optical gain curve 311. With sufficiently low resonator loss, the optical gain in the first optical gain curve 311 gives rise to a lasing electro-magnetic field, which counter propagates with the optical pump beam 200. First order stimulated Brillouin scattering provides the optical gain, and amplifies the electro-magnetic fields, which counter-propagate with the optical pump beam 200.

In this manner, when the optical pump beam 200 exceeds a stimulated Brillouin scattering threshold, the optical pump beam 200 has sufficient optical power to stimulate the first order SBS beam 210 (FIG. 2) at the frequency $v_{SBS1}$ (FIG. 1), which is within the first SBS gain bandwidth that is down-shifted from the pump frequency $v_p$ by the Brillouin Stokes frequency $v_{sbs}$. The frequency between pump laser and first order SBS ($v_p - v_{SBS1}$) is designed to be approximately an integer multiple of the Free Spectral Range (FSR) (N×FSR) of the optical ring resonator. The intensity of the first order SBS beam 210 increases as the intensity of the optical pump beam 200 increases. The first order SBS beam 210 propagates in a second direction that is opposite to the first direction of propagation of the optical pump beam 200.

In turn, as the first order SBS beam 210 propagates in the second direction through the optical ring resonator 50, a second Brillouin scattering gain curve 312 is stimulated by the first order SBS beam 210 at a second Stokes wave frequency $v_{SBS2}$ that is downshifted by the Brillouin Stokes frequency $v_{sbs}$ from the first SBS beam at $v_{SBS1}$. As shown in FIG. 1, the optical ring resonator 50 has a resonator mode 302 within the bandwidth 316 of the second optical gain curve 312. With sufficiently low resonator loss, the optical gain in the first optical gain curve 311 gives rise to a lasing electro-magnetic field counter propagating to the first order SBS beam 210. Second order stimulated Brillouin scattering provides the optical gain, and amplifies electro-magnetic fields, which counter-propagate with the first order SBS beam 210.

In this manner, when the intensity of the first order SBS beam 210 exceeds the stimulated Brillouin threshold, the first order SBS beam 210 has sufficient optical power to stimulate the second order SBS beam 220 at frequency $v_{SBS2}$, which is approximately at one of the resonator resonances within the second order SBS gain bandwidth. The frequency $v_{SBS2}$ of second order SBS beam 220 is roughly N×FSR away from the frequency $v_{SBS1}$ of the first SBS beam, and about 2N×FSR away from pump frequency $v_p$ of pump beam 200. The intensity of the second order SBS beam 220 increases as the intensity of the first order SBS beam 210 increases. As shown in FIG. 1, the second order SBS beam 220 propagates in the first direction that is opposite the second direction of propagation of the first order SBS beam 210. Thus, the second order SBS beam 220 co-propagates with the optical pump beam 200.

The frequency difference between the first order SBS beam 210 and the second order SBS beam 220 is a frequency shift that is a function of the properties of the optical ring resonator 50 (i.e., index of refraction, core size and numerical aperture, etc.) and frequency shift caused by rotation rate ($f_\Omega$). The frequency difference equals to N×FSR, plus a small index-dependent offset of the resonance frequency does not match the center of the gain profile, plus rotation frequency shift. This frequency difference is measured as a beat frequency that is used to determine a rotation rate of the optical ring resonator 50. In one implementation of this embodiment, the $v_{SBS1}$ is downshifted approximately 11 GHz from the pump frequency $v_p$. In this case, the first order SBS beam 210 is downshifted ~11 GHz from the pump frequency $v_p$ and counter propagating with the optical pump beam 200 and the second order SBS beam 220 is downshifted ~22 GHz from the pump frequency $v_p$ and co-propagating with the optical pump beam 200.

As shown in FIG. 2, the optical pump beam 200 is coupled into the optical ring resonator 50 via the optical coupling region 320. A portion of the optical pump beam 200 propagates through the optical ring resonator 50 in a first direction. A reflection port detector 120 is optically coupled to an output of the first optical coupling region 320.

A directional coupler 129 is optically coupled to the second optical coupling region 321. A portion of the light propagating in the first direction (i.e., the optical pump beam 200 and the second order SBS beam 220) is send from the second optical coupling region 321 to the directional coupler 129. The directional coupler 129 splits the optical pump beam 200 and second order SBS beam 220. A portion of the optical pump beam 200 and second order SBS beam 220 is directed to a detector 121. The detector 121 is referred to herein as optical clock detector 121 since it generates a reference frequency signal, which is also referred to herein as a clock signal. The optical clock detector 121 generates the reference frequency signal based on two co-propagating beams. In the embodiments of ring laser gyroscopes shown in FIGS. 2, 3, 4, and 5A, the optical clock detector 121 generates the reference frequency signal based on the co-propagating pump beam 200 and second order SBS beam 220. In the embodiment of ring laser gyroscope shown in FIG. 5A, the optical clock detector 121 generates the reference frequency signal based on the first order SBS beam 210 and a third order SBS beam 230 as described below.

The optical pump beam 200, which co-propagates in the optical ring resonator 50 with the $2^{nd}$ order SBS lasing mode (i.e., second order SBS beam 220), differs from it in frequency by $v_p-v_{SBS2}$ (~22 GHz). This frequency difference does not depend on rotation rate since the electro-magnetic fields co-propagate. The frequency difference is approximately a multiple of the number of the FSRs (2N×FSR) between second order SBS and pump. This beat signal is used as the reference signal, which is also referred to herein as clock signal or a reference/clock signal. The self-generation of the clock signal at optical clock detector 121 cancels out bias errors due to free spectral range (FSR) drift in the optical ring resonator 50 caused by, for example, temperature changes. FSR drift is indistinguishable from rotation on the Brillouin Stokes frequency $v_{sbs}$ (e.g., ~11 GHz) beat note, but is canceled out on the gyro output due to the correlated effect on the doubled Brillouin Stokes frequency $2*v_{sbs}$ (e.g., ~22 GHz) clock signal.

The other portion of the optical pump beam 200 and second order SBS beam 220 is optically coupled from the directional coupler 129 to the optical filter 130. The optical filter 130 couples optical pump beam 200 and second order SBS beam 220 from the directional coupler 129 and filters out the optical pump beam 200. The optical filter 130 is also referred to herein as a "pump rejection filter 130". The optical filters described herein can be optical ring resonators or Bragg gratings. One skilled in the art understands how to design and fabricate these types of optical filters. Other types of optical filters, including future developed optical filters, are possible.

A directional coupler 323 is optically coupled to accept input from the second optical coupling region 321 and the optical filter 130. A portion of the light propagating in the second direction (i.e., the first order SBS beam 210) is sent from the second optical coupling region 321 to the input of the directional coupler 323. The second order SBS beam 220, which is output from the optical filter 130, is also sent to the input of the directional coupler 323. The first order SBS beam 210 and the second order SBS beam 220 are output from the directional coupler 323 as co-propagating optical beams and are incident on the beat detector 130. The co-propagating first order SBS beam 210 and second order SBS beam 220 have beat frequency at the difference between the first frequency ($v_{SBS1}$) of the first order SBS beam 210 and the second frequency ($v_{sbs2}$) of the second order SBS beam 220. The beat detector 131 produces an optical beat signal that varies as a function of a frequency difference between the first order SBS beam 210 and the second order SBS beam 220. The generated beat signal between the first order SBS beam 210 and the second order SBS beam 220 is approximately equal to an integer multiple of the FSRs plus the rotation-induced frequency shift (N×FSR+$f_\Omega$) and is used to determine a rate of rotation based on the beat signal within the gyroscope.

Under rotation, the Sagnac effect causes the resonator cavity of the optical ring resonator 50 to appear longer for one propagation direction and compressed for the other propagation direction, resulting in a differential shift ($f_\Omega$) in the lasing frequencies, from which rotation rate can be ascertained. A high degree of common mode rejection of noise processes is obtained by using two adjacent SBS orders to sense rotation. The two adjacent SBS orders to sense rotation can be the first and second orders of SBS, as described herein, the second and third order of SBS, the third and fourth order of SBS, and so forth.

Since almost all noise sources are common between these two resonant lasing modes, the dominant noise source on this beat frequency measurement is quantum noise. Thus, the Angle Random Walk (ARW) depends on the output power of each lasing mode.

Exemplary embodiments of ring laser gyroscopes that include the ring-laser-gyroscope portion 15 or variations on the ring-laser-gyroscope portion 15 shown in FIG. 2 are described below with reference to FIGS. 3, 4, 5A, and 5B. In the exemplary embodiments of ring laser gyroscopes described below with reference to FIGS. 3, 4, 5A, and 5B, the optical beams in the ring laser gyroscope external to the optical ring resonator 50 are guided through rigid optical waveguides. Other techniques for guiding and directing light are possible.

Figure 3:
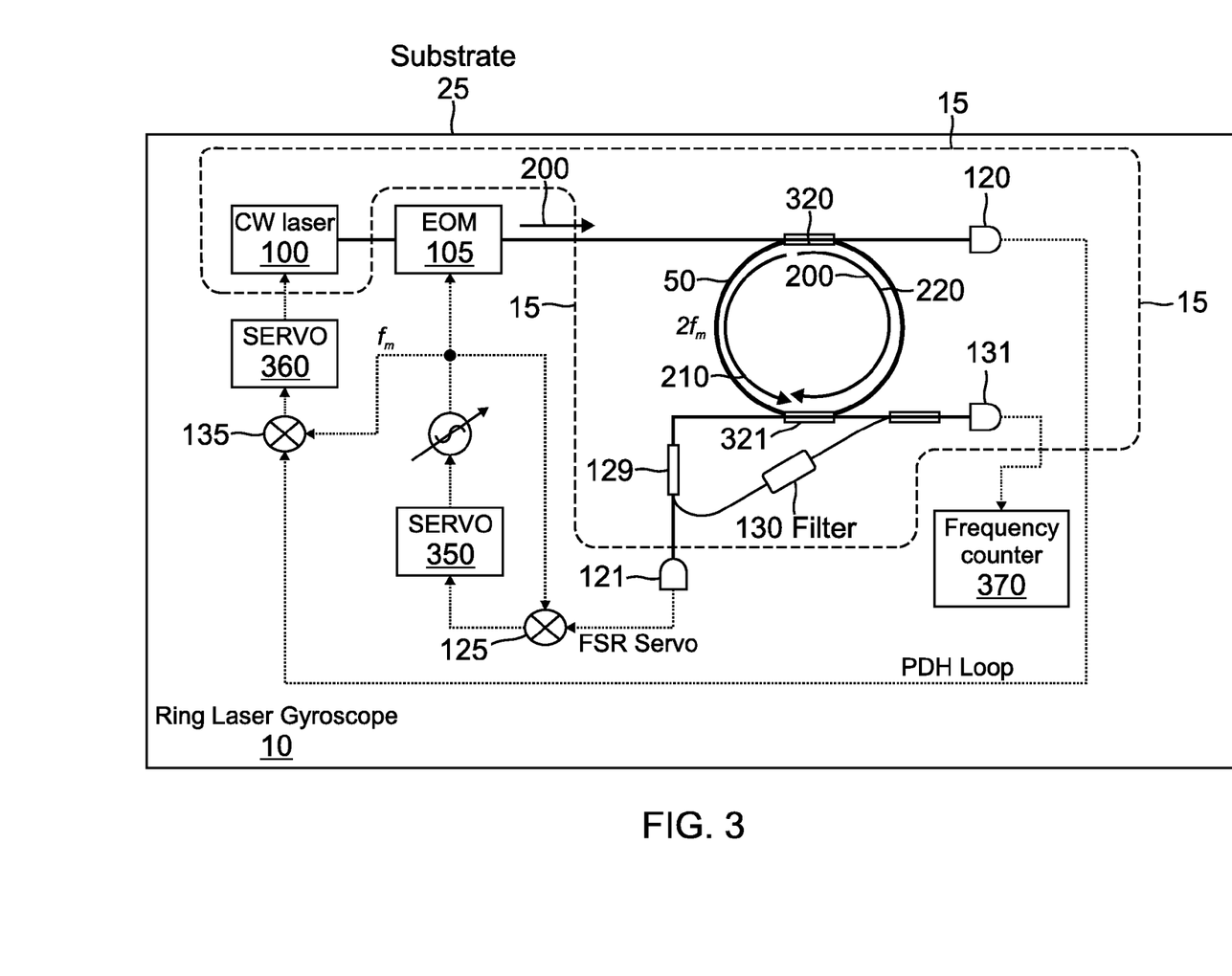
FIG. 3 shows an embodiment of a ring laser gyroscope in accordance with the present application.

FIG. 3 shows an embodiment of a RLG 10 in accordance with the present application. The RLG 10 includes the ring-laser-gyroscope portion 15 shown in FIG. 2 as well as: an electro-optical modulator 105 that modulates the optical pump beam 200 emitted from the continuous wave laser; a transmission port detector 111; a frequency measurement device 370; free spectral range (FSR) loop electronics; and Pound-Hall-Drever (PDH) loop electronics. The FSR loop electronics include a FSR mixer 125; a FSR servo 350 to accept the output of the FSR mixer 125. The PDH loop electronics include a PDH mixer 135 and a PDH servo 360. The beat detector 131 outputs a signal to the frequency measurement device 370. A frequency measurement device is sometimes referred to as a frequency counter.

The RLG 10 is positioned on a substrate 25. In one implementation of this embodiment, one or more of the components of the RLG 10 is formed within the interior area of substrate 25.

The readout-out mechanism of RLG 10 is similar to that of a conventional RLG, the best and most expensive of which are also quantum noise limited. However, because the RLG 10 has an ~11 GHz frequency splitting even at zero rotation rate, there is no risk of backscatter from one mode into the counter-propagating mode seeding the laser pump 100 and causing the "lock-in" effect that occurs in conventional RLGs, where the counter propagating resonance frequencies become degenerate at small rates. In conventional RLGs, a "dither motor" is required to prevent resonance frequencies from becoming degenerate at small rates; the dither motor rotates the gyro to ensure that it always measures a rate above the lock-in threshold.

Advantageously, the RLG 10 does not have lock-in and therefore does not require a dither motor or any moving part. In addition, the high signal frequency (e.g., ~11 GHz) provides some advantage in high-dynamic environments. In a prior art gyroscope, the photodetectors and amplifiers are optimized for high sensitivity at low frequencies in order to detect small rotations, where a DC output corresponds to zero rotation rate. These prior art photodetectors and amplifiers might not have the bandwidth to accurately sense the ~20 MHz beat signal, which would be expected (given the form factor described previously) for a 100,000 deg/sec rotation rate. For photodetectors and amplifiers, which are optimized to sense 11 GHz, a 20 MHz frequency change does not stretch the bandwidth limits of the photodetectors and amplifiers.

However, the change in the frequency difference between the first and second order modes induced by the Sagnac effect by Earth's rotation rate (at the poles) is on the order of one Hertz for a resonator with an approximately 1 square inch enclosed area. The clock signal is of high enough quality to indicate exactly when one second has passed to within one part in 11 billion, so a user knows how many light-dark cycles have been observed in that that time. The clock signal will be divided into half frequency (N×FSR~11 GHz).

In this case, the clock signal uses the 22 GHz signal as a frequency reference since the optical pump beam 200 and co-propagating second order SBS beam 220 differs in frequency by $2\nu_{sbs}$=22 GHz. This frequency difference is independent of the rotation rate, since a rotation affects electro-magnetic fields propagating in the same direction in the same way, and cancels out when the difference frequency is measured.

The $2\nu_{sbs}$ GHz clock signal has an advantage over any external frequency references of any quality. The clock frequency may wander in absolute terms due to effects (such as temperature changes), which cause a change in the path length and thus the FSR of the resonator. However, any such effect on the FSR will also change the frequency of the 11 GHz signal on which the rotation is encoded. Since that change is not rotation related, it represents an error. But if an exactly corresponding change occurs in the frequency reference, then the error cancels out of the actual rotation measurement.

In one implementation of this embodiment, the signal processing scheme to enable common mode error cancelation divides the (2N×FSR) signal frequency by two and then mixes it with the (N×FSR+$f_\Omega$) signal. The output of this mixer is low-pass filtered. For a perfect optical ring resonator 50, the mixer output is DC at zero rotation rate, and about a half a Hertz at Earth rate; the 11 GHz "background" is removed, along with any changes in the FSR.

The output frequency of a laser depends not only on the "cold cavity" resonance frequency of the resonator, but also on the center frequency of the optical gain curves 311 and 312. If the free spectral range of the optical ring resonator 50 is not perfectly tuned to match the SBS frequency shift $\nu_{sbs}$, the different cavity resonances (i.e., 301 and 302 shown in FIG. 1) are separated from the nearest gain peak (i.e., 311, and 312 shown in FIG. 1) by different amounts. This creates mode pulling that is not fully canceled out by the mixing with the 22 GHz described above. However, it is a repeatable phenomenon for a given optical ring resonator, and can be characterized as a function of temperature, and subtracted out. Mode pulling can potentially be used to electronically separate any signal coming from the beating of the first order SBS beam 210 with the residual optical pump beam 200 that is passed through the optical filter 130.

Figure 4:
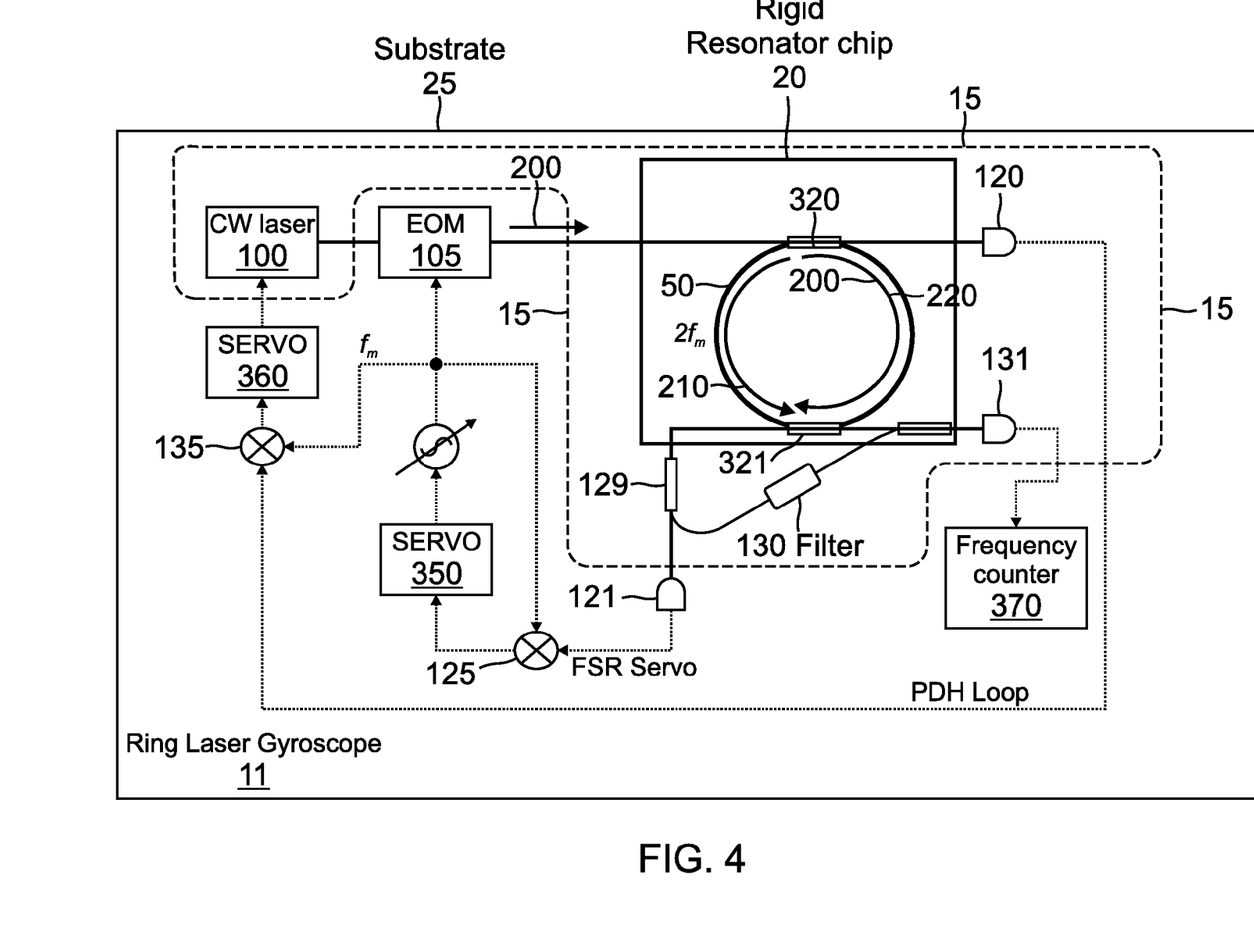
FIG. 4 shows an embodiment of a ring laser gyroscope on a chip in accordance with the present application.

FIG. 4 shows an embodiment of a RLG 11 on a chip 20 in accordance with the present application. The embodiment of the RLG 10 shown in FIG. 4 differs from the embodiment of RLG 10 shown in FIG. 3 in that that optical ring resonator 50 is on a rigid resonator chip 20. In another implementation of this embodiment, the chip 20 supports other components of the RLG 11. The optical ring resonator 50 is etched in the chip 20 to minimize round-trip resonator loss, including excess loss at the optical coupling regions 320 and 321.

In one implementation of this embodiment, the laser 100 is formed on the rigid resonator chip 20 and the waveguide, in which the optical ring resonator 50 is formed, wraps around the laser 100. In one implementation of this embodiment, the rigid resonator chip 20 is the whole substrate 25. Currently used and future developed hybrid integration processing techniques allow for co-location of lasers, detectors, optical filters, and any required modulators or optical amplifiers on the same chip.

In one implementation of this embodiment, the rigid resonator chip 20 is on the order of inches.

Figure 5A:
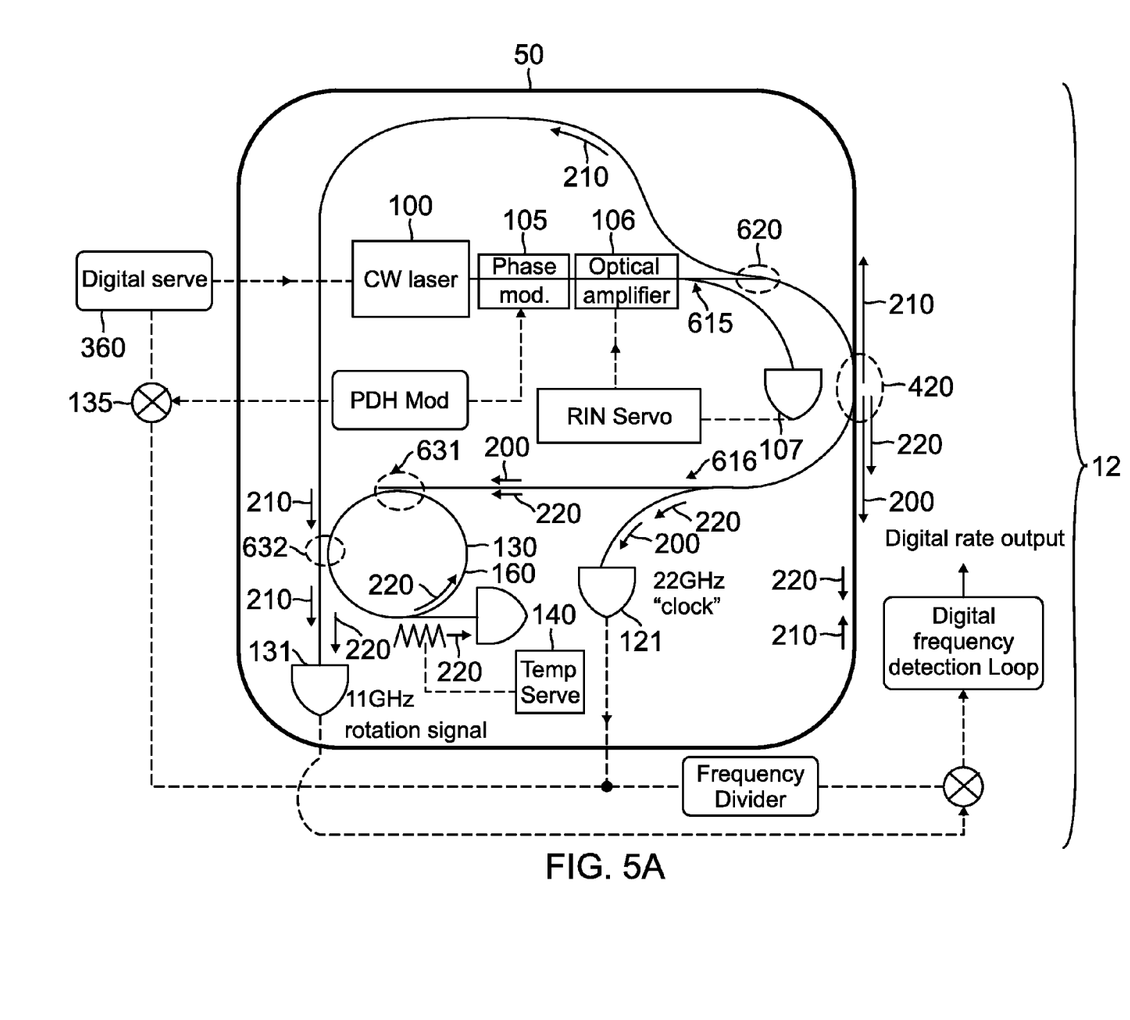
FIG. 5A shows an embodiment of a ring laser gyroscope in accordance with the present application.

FIG. 5A shows an embodiment of a RLG 12 in accordance with the present application. The RLG 12 differs from the RLGs 10 and 11, described above with reference to FIGS. 3 and 4, in that the optical ring resonator 50 has a single optical coupling region represented generally at 420. This advantageously reduces the loss in the optical ring resonator 50. As shown in FIG. 5A, the pump beam 200 emitted from the optical source 100 (pump laser 100) is modulated by the phase modulator 105 and amplified by the amplifier 106. A portion of the optical pump beam 200 is tapped off from the waveguide by a Y-splitter 615 to the relative intensity noise (RIN) monitor 107. The untapped optical pump beam 200 propagates through a circulator represented generally at 620 and is coupled into the optical ring resonator 50 at the optical coupling region 420 of the optical ring resonator 50. In one implementation of this embodiment, circulator 620 is replaced by a directional coupler.

The optical pump beam 200 and a second order SBS beam 220 propagate in the optical ring resonator 50 in a first direction, which in this exemplary embodiment is clockwise. The first order SBS beam 210 propagates in the optical ring resonator 50 in a second direction, which in this exemplary embodiment is counter-clockwise.

When the first order SBS beam 210, which propagates in the second direction through the optical ring resonator 50, passes the optical coupling region 420, a portion is guided to the beat detector 131. When the optical pump beam 200 and a second order SBS beam 220, which propagate in the first direction through the optical ring resonator 50, pass the optical coupling region 420, a portion of each beam is guided via Y-splitter 616 to the optical clock detector 121 that generates a reference/clock signal. In this manner, optical clock detector 121 generates a reference frequency signal based on the co-propagating optical pump beam 200 and a second order SBS beam 220.

The remainder of the optical pump beam 200 and a second order SBS beam 220 couple to the optical filter 130 at the coupling region 631. The optical filter 130 in this embodiment is an optical ring resonator 130 that resonates at the frequency of the second order SBS beam 220. The optical ring resonator 130 filters the optical pump beam 200 from the second order SBS beam 220. The pump filtering optical ring resonator 130 is also referred to herein as a "filtering-ring resonator 160" and a "pump rejection filter 160". The pump beam 200 does not resonate in the pump rejection filter 160 and the second order SBS beam 220 does resonate in the pump rejection filter 160. The pump beam 100 is dumped from the RLG 12 by one of several possible techniques as is understandable to one skilled in the art.

A portion of the resonating second order SBS beam 220 is coupled out of the pump rejection filter 160 via optical coupling region 632 to the waveguide in which the first order SBS beam 210 is propagating. In this manner, the second order SBS beam co-propagates with the first order SBS beam and the co-propagating beams are incident on the beat detector 131.

In the embodiment shown in FIG. 5A, the pump rejection filter 160 is thermally controlled by temperature servo 140 and resistive elements to ensure resonance at the second order SBS beam 220 is maintained. The gyro electronics process the signals from the beat detector 131 and the reference/clock signal from the optical clock detector 121 as described above with reference to FIG. 3.

Figure 5B:
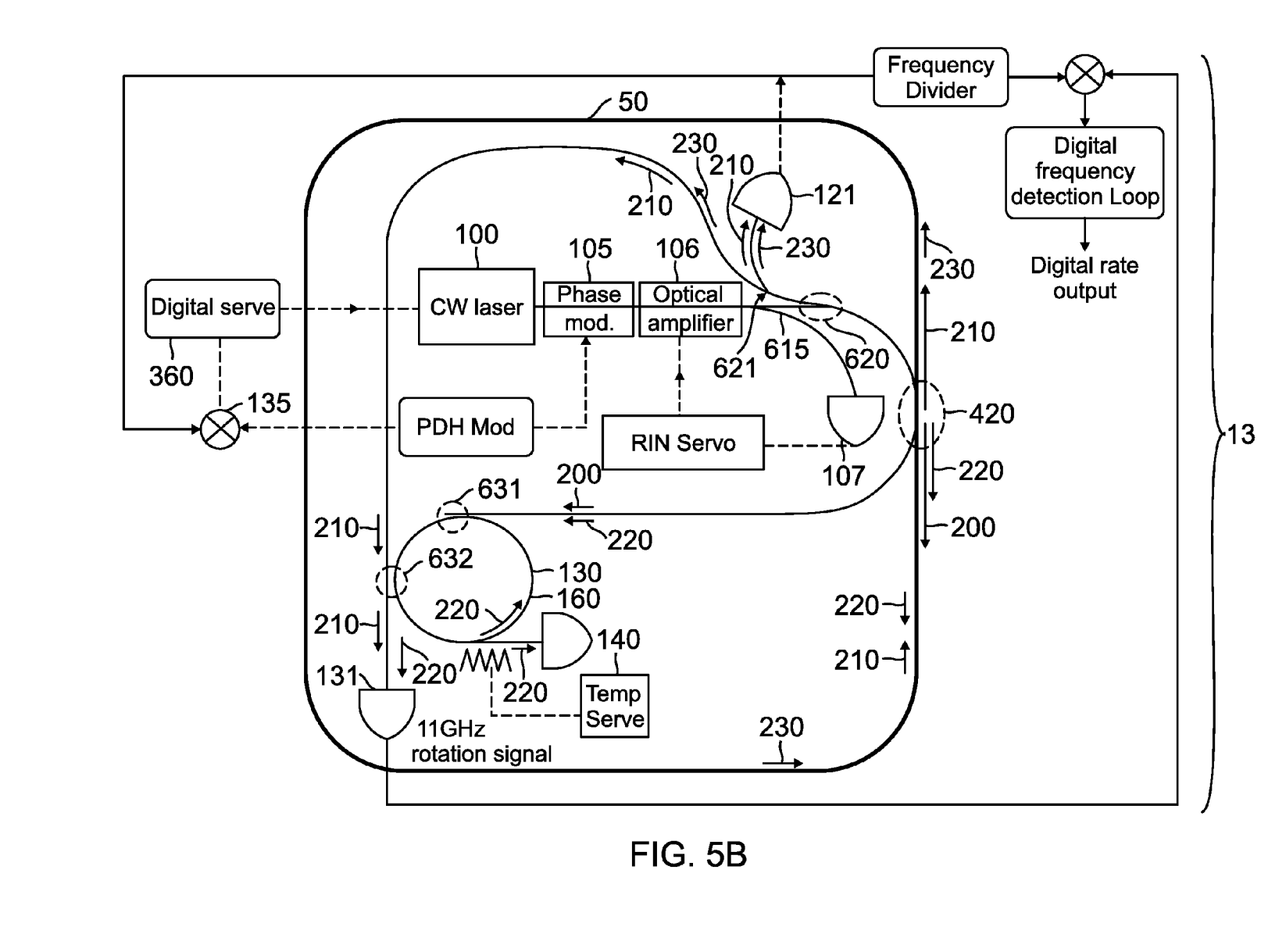
FIG. 5B shows an embodiment of a ring laser gyroscope in accordance with the present application.

FIG. 5B shows an embodiment of a RLG 13 in accordance with the present application. The RLG 13 differs from the RLG 12, described above with reference to FIG. 5A, in that the beat note between 1$^{st}$ order SBS 210 and 3$^{rd}$ order SBS 230 is used to generate the reference frequency/clock signal at the optical clock detector 121, unlike the embodiment of FIG. 5A in which the pump 210 and second order SBS generate the reference frequency/clock signal at the optical clock detector 121. The third order SBS 230 at a third stokes wave frequency co-propagates in the second direction with the first order SBS 210 at the first stokes wave frequency. The third stokes wave frequency is downshifted by twice the Brillouin Stokes frequency from the first stokes wave frequency.

As second order SBS beam 22 propagates in the first direction through the optical ring resonator 50, a third Brillouin scattering gain curve is stimulated by the second order SBS beam 220 at a third Stokes wave frequency $v_{SBS3}$ that is downshifted by the Brillouin Stokes frequency $v_{sbs}$ from the second SBS beam at $v_{SBS2}$. The optical ring resonator 50 has a resonator mode within the bandwidth 16 of the third optical gain curve. With sufficiently low resonator loss, the optical gain in the second optical gain curve 312 gives rise to a lasing electro-magnetic field counter propagating to the second order SBS beam 220. Third order stimulated Brillouin scattering provides the optical gain, and amplifies electro-magnetic fields, which counter-propagate with the second order SBS beam 220 and co-propagate with the first order SBS beam 210.

In this manner, when the intensity of the second order SBS beam 220 exceeds the stimulated Brillouin threshold, the second order SBS beam 220 has sufficient optical power to stimulate the third order SBS beam 230 at frequency $v_{SBS3}$. The frequency $v_{SBS3}$ of third order SBS beam 230 is roughly N×FSR away from the frequency $v_{SBS2}$ of the second order SBS beam 220, and about 2N×FSR away from the frequency $v_{SBS2}$ of the second order SBS beam 220. The intensity of the third order SBS beam 230 increases as the intensity of the second order SBS beam 220 increases.

In this embodiment, when the first order SBS beam 210 and the third order SBS 230, which propagate in the second direction through the optical ring resonator 50, pass the optical coupling region 420, a portion of each beam is guided via Y-splitter 621 to the optical clock detector 121 to generate the reference frequency/clock signal. In this manner, optical clock detector 121 generates a reference frequency signal based on the co-propagating first order SBS beam 210 and the third order SBS 230.

The remainder of the first order SBS beam 210 and the third order SBS 230 is guided to the beat detector 131 via the Y-splitter 621.

When the optical pump beam 200 and a second order SBS beam 220, which propagate in the first direction through the optical ring resonator 50, pass the optical coupling region 420, the co-propagating optical beams are guided to the pump rejection filter 160. The gyro electronics process the signals from the beat detector 131 and the reference/clock signal from the optical clock detector 121 as described above with reference to FIG. 3.

Figure 6:
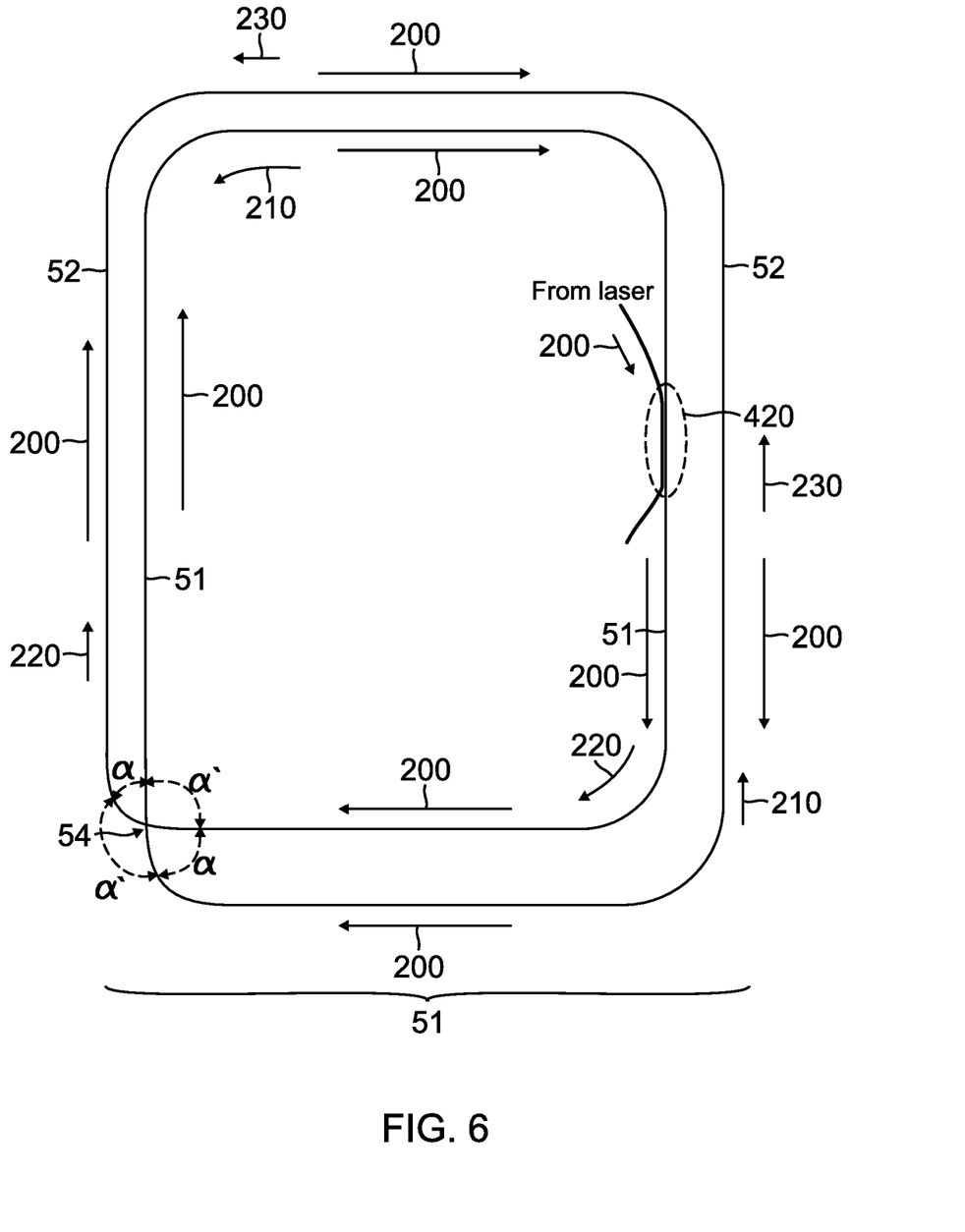
FIG. 6 shows an embodiment of an optical ring resonator configured as an N-turn waveguide loop in accordance with the present application.

FIG. 6 shows an embodiment of an optical ring resonator 51 configured as an N-turn waveguide loop 51 in accordance with the present application. An optical ring resonator that is configured as an N-turn waveguide loop has N loops, where N is a positive integer greater than 1. The inner-most loop is connected to the outer-most loop a section of waveguide that has N−1 single-layer crossovers. In the exemplary embodiment shown in FIG. 6, the multiple-turn waveguide loop is a two-turn waveguide loop 51 with one layer crossover 54. The two-turn waveguide loop has an inner loop 51 and an outer loop 52. The coupling region 420 is on the inner loop 51 for an embodiment in which the laser 100 in encircled by the optical ring resonator 51. In another implementation of this embodiment, the coupling region 420 is on the outer loop 52 for an embodiment in which the laser 100 in not encircled by the optical ring resonator 51.

Any of the embodiments of ring laser gyroscopes described herein can be implemented with the optical ring resonator 51 in place of the optical ring resonator 50. A "single layer crossover" is defined herein as a crossing of two optical waveguides which are formed from the same layer or the same plurality of layers. The single layer crossover is shown to be at angles $\alpha$ and $\alpha'$, where $\alpha+\alpha'=180°$. In one implementation of this embodiment, $\alpha$ is 120° and $\alpha'$ is 60°. In another implementation of this embodiment, $\alpha$ and $\alpha'$ are both 90°.

As is understandable to one skilled in the art, the optical ring resonator in the ring laser gyroscopes described herein can also be three-turn waveguide loop with two single layer crossovers 54, a four-turn waveguide loop with three single layer crossovers 54, etc. The limit on the number of turns in the waveguide is constrained by the loss in each single layer crossover 54 and the required gain in the optical waveguide. As the loss in the single layer crossover 54 improves more turn can be implemented.

Figure 7:
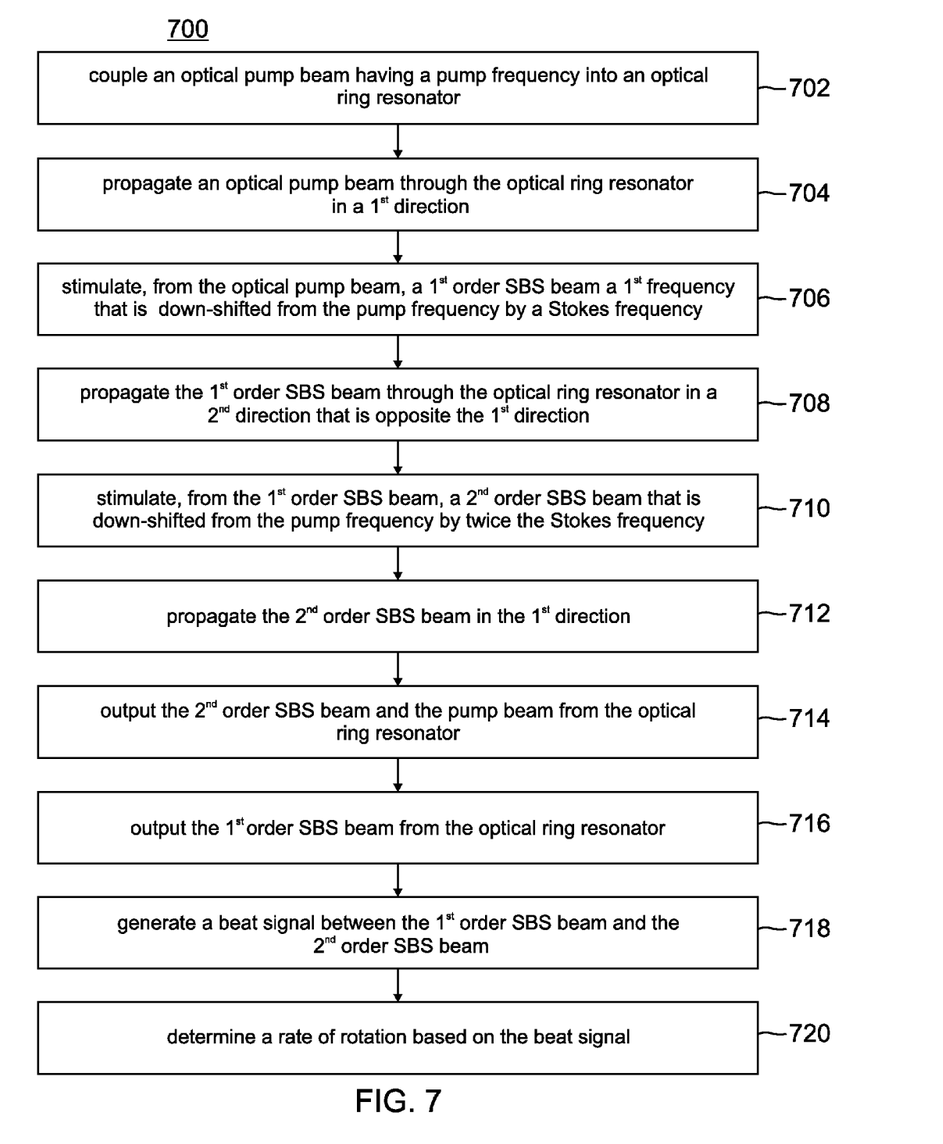
FIG. 7 shows a method of measuring rotation in accordance with the present application.

FIG. 7 shows a method 700 of measuring rotation in accordance with the present application. The method 700 is described with reference to the RLG 10 of FIG. 3. The embodiment of method 700 is described as being implemented using the RLG 10 of FIG. 3 that includes the portion 15 shown in FIG. 2 and the frequency distribution shown in FIG. 1. The process of method 700 is applicable to other embodiments of RLGs that include the portion 15 of an embodiment of a ring laser gyroscope shown in FIG. 2.

At block 702, an optical pump beam 200 having a pump frequency $v_p$ is coupled into an optical ring resonator 50. In one implementation of this embodiment, the optical ring resonator 50 is a rigid optical waveguide. In another implementation of this embodiment, the optical ring resonator 50 is an optical fiber. In yet another implementation of this embodiment, the optical beams in the ring laser gyroscope external to the optical ring resonator 50 are guided through rigid optical waveguides. In yet another implementation of this embodiment, the optical beams in the ring laser gyroscope external to the optical ring resonator 50 are guided through optical fibers. In yet another implementation of this embodiment, the optical beams in the ring laser gyroscope external to the optical ring resonator 50 propagate through air and are guided through a combination of optical fiber and rigid waveguides. At block 704, the optical pump beam 200 propagates through the optical ring resonator 50 in a first direction. At block 706, the optical pump beam 200 stimulates a first order stimulated Brillouin scattering (SBS) beam 210 at a first frequency $v_{SBS1}$ that is down-shifted from the pump frequency $v_p$ by a Brillouin Stokes frequency $v_{sbs}$. A first optical gain curve 311 is stimulated at a first Stokes wave frequency $v_{SBS1}$ downshifted by a Brillouin Stokes frequency $v_{sbs}$ from the pump frequency $v_p$ as the optical pump beam 200 propagates through the optical ring resonator 50 in the first direction.

At block 708, the first order SBS beam 210 propagates through the optical ring resonator 50 in a second direction that is opposite the first direction.

At block 710, the first order SBS beam 210 stimulates a second order SBS beam 220 at a second frequency that is down-shifted from the pump frequency $v_p$ by twice the Brillouin Stokes frequency $2v_{sbs}$. A second optical gain curve 312 is stimulated at the second Stokes wave frequency $v_{SBS2}$ downshifted by twice the Brillouin Stokes frequency $2v_{sbs}$ from the pump frequency $v_p$ by the first order SBS beam 210 propagating through the optical ring resonator 50 in the second direction.

At block 712, the second order SBS beam 220 propagates in the optical ring resonator 50 in the first direction. In this manner, the second order SBS beam 220 co-propagates with the optical pump beam 200.

At block 714, the second order SBS beam 220 and the optical pump beam 200 are output from the optical coupling region 321 of optical ring resonator 50. The second order SBS beam 220 is separated from the optical pump beam 200 by an optical filter 130.

At block 716, the first order SBS beam 210 is output from the optical coupling region 420 of the optical ring resonator 50. The optical pump beam 200 and a first order SBS beam 210 are also output from the optical ring resonator 50 and guided to the pump rejection filter 130. In one implementation of this embodiment, the optical pump beam 200 and a first order SBS beam 210 are also output from the optical ring resonator 50 and guided to the optical clock detector 121, which generates the reference frequency signal based on the co-propagating pump beam 200 and second order SBS beam 220. In another implementation of this embodiment, the first order SBS beam 210 and a third order SBS beam 230 are also output from the optical ring resonator 50 and guided to the optical clock detector 121, which generates the reference frequency signal based on the co-propagating first order SBS beam 210 and a third order SBS beam 230.

At block 718, a beat signal between the first order SBS beam 210 and the second order SBS beam 220 is generated. The first order SBS beam 210 and the second order SBS beam 220 are combined at the coupler 323 and the combined signals are incident on a beat detector 131. The first order SBS beam 210 and the second order SBS beam 220 beat with each other at the beat frequency equal to the Brillouin Stokes frequency $v_{sbs}$. At block 720, a rate of rotation of the optical ring resonator 50 is determined based on the beat signal between the first order SBS beam 210 and the second order SBS beam 220.

In this manner a compact, robust ring laser gyroscope is formed on a substrate and is able to measure the rotation rate without fragile moving parts. The ring laser gyroscopes described herein can be monolithically integrated and are appropriate for thermally extreme environments while being tolerant of high shock, and high vibration applications.

Example Embodiments

Example 1 includes a ring laser gyroscope comprising: an optical ring resonator configured to propagate optical beams in a first direction and a second direction, the second direction being opposite the first direction, the optical ring resonator including at least one optical coupling region to couple optical beams into and out of the optical ring resonator; and an optical source to provide a pump beam at a pump frequency, the pump beam being optically coupled to the optical ring resonator in the first direction; wherein the pump beam stimulates a first optical gain curve at a first stokes wave frequency downshifted by a Brillouin stokes frequency from the pump frequency, wherein the optical ring resonator has a resonator mode within a bandwidth of the first optical gain curve, wherein the resonator round-trip loss is less than the first optical gain, so that a first order stimulated Brillouin scattering (SBS) beam propagates in the second direction, wherein the first order SBS beam stimulates a second optical gain curve at a second stokes wave frequency downshifted by twice the Brillouin Stokes frequency from the pump frequency, wherein the optical ring resonator has a resonator mode within the bandwidth of the second optical gain curve, wherein the resonator round-trip loss is less than a second optical gain, so that a second order SBS beam propagates in the first direction; and the ring laser gyroscope further comprising: a beat detector configured to produce an optical beat signal that varies as a function of a frequency difference between the first order SBS beam and the second order SBS beam; and an optical clock detector to generate a reference frequency signal based on two co-propagating beams.

Example 2 includes the ring laser gyroscope of Example 1, wherein the optical clock detector is configured to generate the reference frequency signal based on a beat signal between the pump frequency and the second stokes wave frequency, which is downshifted by twice the Brillouin Stokes frequency from the pump frequency.

Example 3 includes the ring laser gyroscope of any of Examples 1-2, wherein the optical clock detector is configured to generate the reference frequency signal based on a beat signal between the first order SBS frequency and a third stokes wave frequency of a third order stimulated Brillouin scattering (SBS) beam, the third stokes wave frequency being downshifted by twice the Brillouin Stokes frequency from the first stokes wave frequency.

Example 4 includes the ring laser gyroscope of any of Examples 1-3, wherein the optical ring resonator is a rigid optical waveguide resonator.

Example 5 includes the ring laser gyroscope of any of Examples 1-4, wherein the optical ring resonator is an N-turn waveguide loop with N−1 single-layer crossovers, where N is a positive integer greater than any of Examples 1-4.

Example 6 includes the ring laser gyroscope of any of Examples 1-5, further comprising: a pump rejection filter configured to reject the pump beam after the co-propagating pump beam and the second order SBS beam are output from the optical ring resonator.

Example 7 includes the ring laser gyroscope of Example 6, wherein the pump rejection filter is a filtering-ring resonator, the filtering-ring resonator further configured to couple the second order SBS beam to co-propagate with the first order SBS beam to be incident on the beat detector.

Example 8 includes the ring laser gyroscope of any of Examples 1-7, further comprising: a substrate on which the optical ring resonator is formed and on which the optical source to provide the pump beam is positioned.

Example 9 includes the ring laser gyroscope of any of Examples 1-8, further comprising: a substrate on which the optical ring resonator is formed and on which the optical source to provide the pump beam is positioned; and electronics positioned on the substrate and configured to process optical beams output from the optical ring resonator to measure rotation.

Example 10 includes a ring laser gyroscope comprising: an optical ring resonator formed on a substrate and configured to propagate optical beams in a first direction and a second direction, the second direction being opposite the first direction, the optical ring resonator having at least one optical coupling region to couple optical beams into and out of the optical ring resonator; an optical source positioned on the substrate, the optical source configured to optically couple a pump beam at a pump frequency into the optical ring resonator to propagate in the first direction, wherein the pump beam stimulates a first optical gain curve at a first stokes wave frequency downshifted by a Brillouin stokes frequency from the pump frequency, wherein the optical ring resonator has a resonator mode within a bandwidth of the first optical gain curve, wherein the resonator round-trip loss is less than the first optical gain, so that a first order stimulated Brillouin scattering (SBS) beam propagates in the second direction, wherein the first order SBS beam stimulates a second optical gain curve at a second stokes wave frequency downshifted by twice the Brillouin Stokes frequency from the pump frequency, wherein the optical ring resonator has a resonator mode within the bandwidth of the second optical gain curve, wherein the resonator round-trip loss is less than a second optical gain, so that a second order SBS beam propagates in the first direction; and the ring laser gyroscope further comprising: a beat detector positioned on the substrate and configured to produce an optical beat signal that varies as a function of a frequency difference between the first order SBS beam and the second order SBS beam; an optical clock detector positioned on the substrate, the optical clock configured to generate a reference frequency signal based on two co-propagating beams; and a pump rejection filter to reject the pump beam from the second order SBS beam after the pump beam and the second order SBS beam propagating in the first direction are output from the optical ring resonator.

Example 11 includes the ring laser gyroscope of Example 10, wherein the optical clock detector is configured to generate the reference frequency signal based on a beat signal between the pump frequency and the second stokes wave frequency, which is downshifted by twice the Brillouin Stokes frequency from the pump frequency.

Example 12 includes the ring laser gyroscope of any of Examples 10-11, wherein the optical clock detector is configured to generate the reference frequency signal based on a beat signal between the first order SBS frequency and a third stokes wave frequency of a third order stimulated Brillouin scattering (SBS) beam, the third stokes wave frequency being downshifted by twice the Brillouin Stokes frequency from the first stokes wave frequency.

Example 13 includes the ring laser gyroscope of any of Examples 10-12, wherein the optical ring resonator is an N-turn waveguide loop with N−1 single-layer crossovers, where N is a positive integer greater than any of Examples 1-12.

Example 14 includes the ring laser gyroscope of any of Examples 10-13, wherein the pump rejection filter is a filtering-ring resonator, which is formed in the substrate and is further configured to couple the second order SBS beam to co-propagate with the first order SBS beam to be incident on the beat detector.

Example 15 includes the ring laser gyroscope of Example 14, wherein the optical ring resonator is a rigid optical waveguide resonator and the filtering-ring resonator is a rigid optical waveguide resonator.

Example 16 includes the ring laser gyroscope of any of Examples 10-15, wherein the optical ring resonator is a rigid optical waveguide resonator.

Example 17 includes a method for measuring rotation, the method comprising: propagating the optical pump beam through an optical ring resonator in a first direction; stimulating, from the optical pump beam, a first order stimulated Brillouin scattering (SBS) beam at a first frequency that is down-shifted from the pump frequency by a Brillouin Stokes frequency; propagating the first order SBS beam through the optical ring resonator in a second direction that is opposite the first direction, stimulating, from the first order SBS beam, a second order SBS beam at a second frequency that is down-shifted from the pump frequency by twice the Brillouin Stokes frequency; and propagating the second order SBS beam in the first direction; outputting the second order SBS beam and the pump beam from the optical ring resonator; outputting the first order SBS beam from the optical ring resonator; generating a beat signal between the first order SBS beam and the second order SBS beam at a beat detector; and determining a rate of rotation based on the beat signal.

Example 18 includes the method of Example 17, further comprising: generating a reference frequency signal based on two co-propagating beams being incident on an optical clock detector.

Example 19 includes the method of any of Examples 17-18, further comprising: separating the second order SBS beam from the pump beam by a pump rejection filter.

Example 20 includes the method of any of Examples 17-19, further comprising: coupling the second order SBS beam from the pump rejection filter to co-propagate with the first order SBS beam; and guiding the co-propagating the first order SBS beam and the second order SBS beam to be incident on the beat detector.

Although specific embodiments have been illustrated and described herein, it will be appreciated by those of ordinary skill in the art that any arrangement, which can achieve the same purpose, may be substituted for the specific embodiments shown. Therefore, it is manifestly intended that this invention be limited only by the claims and the equivalents thereof.

What is claimed is:

1. A ring laser gyroscope comprising:
an optical ring resonator configured to propagate optical beams in a first direction and a second direction, the second direction being opposite the first direction, the optical ring resonator including at least one optical coupling region to couple optical beams into and out of the optical ring resonator; and
an optical source to provide a pump beam at a pump frequency, the pump beam being optically coupled to the optical ring resonator in the first direction;
wherein the pump beam stimulates a first optical gain curve at a first stokes wave frequency downshifted by a Brillouin stokes frequency from the pump frequency,
wherein the optical ring resonator has a resonator mode within a bandwidth of the first optical gain curve,
wherein the resonator round-trip loss is less than the first optical gain, so that a first order stimulated Brillouin scattering (SBS) beam propagates in the second direction,
wherein the first order SBS beam stimulates a second optical gain curve at a second stokes wave frequency downshifted by twice the Brillouin Stokes frequency from the pump frequency,
wherein the optical ring resonator has a resonator mode within the bandwidth of the second optical gain curve,
wherein the resonator round-trip loss is less than a second optical gain, so that a second order SBS beam propagates in the first direction; and
the ring laser gyroscope further comprising:
a beat detector configured to produce an optical beat signal that varies as a function of a frequency difference between the first order SBS beam and the second order SBS beam; and
an optical clock detector to generate a reference frequency signal based on two co-propagating beams.

2. The ring laser gyroscope of claim 1, wherein the optical clock detector is configured to generate the reference frequency signal based on a beat signal between the pump frequency and the second stokes wave frequency, which is downshifted by twice the Brillouin Stokes frequency from the pump frequency.

3. The ring laser gyroscope of claim 1, wherein the optical clock detector is configured to generate the reference frequency signal based on a beat signal between the first order SBS frequency and a third stokes wave frequency of a third order stimulated Brillouin scattering (SBS) beam, the third stokes wave frequency being downshifted by twice the Brillouin Stokes frequency from the first stokes wave frequency.

4. The ring laser gyroscope of claim 1, wherein the optical ring resonator is a rigid optical waveguide resonator.

5. The ring laser gyroscope of claim 1, wherein the optical ring resonator is an N-turn waveguide loop with N−1 single-layer crossovers, where N is a positive integer greater than 1.

6. The ring laser gyroscope of claim 1, further comprising:
a pump rejection filter configured to reject the pump beam after the co-propagating pump beam and the second order SBS beam are output from the optical ring resonator.

7. The ring laser gyroscope of claim 6, wherein the pump rejection filter is a filtering-ring resonator, the filtering-ring resonator further configured to couple the second order SBS beam to co-propagate with the first order SBS beam to be incident on the beat detector.

8. The ring laser gyroscope of claim 1, further comprising:
a substrate on which the optical ring resonator is formed and on which the optical source to provide the pump beam is positioned.

9. The ring laser gyroscope of claim 1, further comprising:
a substrate on which the optical ring resonator is formed and on which the optical source to provide the pump beam is positioned; and
electronics positioned on the substrate and configured to process optical beams output from the optical ring resonator to measure rotation.

10. A ring laser gyroscope comprising:
an optical ring resonator formed on a substrate and configured to propagate optical beams in a first direction and a second direction, the second direction being opposite the first direction, the optical ring resonator having at least one optical coupling region to couple optical beams into and out of the optical ring resonator;
an optical source positioned on the substrate, the optical source configured to optically couple a pump beam at a pump frequency into the optical ring resonator to propagate in the first direction,
wherein the pump beam stimulates a first optical gain curve at a first stokes wave frequency downshifted by a Brillouin stokes frequency from the pump frequency,
wherein the optical ring resonator has a resonator mode within a bandwidth of the first optical gain curve,
wherein the resonator round-trip loss is less than the first optical gain, so that a first order stimulated Brillouin scattering (SBS) beam propagates in the second direction,
wherein the first order SBS beam stimulates a second optical gain curve at a second stokes wave frequency downshifted by twice the Brillouin Stokes frequency from the pump frequency,
wherein the optical ring resonator has a resonator mode within the bandwidth of the second optical gain curve, wherein the resonator round-trip loss is less than a second optical gain, so that a second order SBS beam propagates in the first direction; and
the ring laser gyroscope further comprising:
a beat detector positioned on the substrate and configured to produce an optical beat signal that varies as a function of a frequency difference between the first order SBS beam and the second order SBS beam;
an optical clock detector positioned on the substrate, the optical clock configured to generate a reference frequency signal based on two co-propagating beams; and
a pump rejection filter to reject the pump beam from the second order SBS beam after the pump beam and the second order SBS beam propagating in the first direction are output from the optical ring resonator.

11. The ring laser gyroscope of claim 10, wherein the optical clock detector is configured to generate the reference frequency signal based on a beat signal between the pump frequency and the second stokes wave frequency, which is downshifted by twice the Brillouin Stokes frequency from the pump frequency.

12. The ring laser gyroscope of claim 10, wherein the optical clock detector is configured to generate the reference frequency signal based on a beat signal between the first order SBS frequency and a third stokes wave frequency of a third order stimulated Brillouin scattering (SBS) beam, the third stokes wave frequency being downshifted by twice the Brillouin Stokes frequency from the first stokes wave frequency.

13. The ring laser gyroscope of claim 10, wherein the optical ring resonator is an N-turn waveguide loop with N−1 single-layer crossovers, where N is a positive integer greater than 1.

14. The ring laser gyroscope of claim 10, wherein the pump rejection filter is a filtering-ring resonator, which is formed in the substrate and is further configured to couple the second order SBS beam to co-propagate with the first order SBS beam to be incident on the beat detector.

15. The ring laser gyroscope of claim 14, wherein the optical ring resonator is a rigid optical waveguide resonator and the filtering-ring resonator is a rigid optical waveguide resonator.

16. The ring laser gyroscope of claim 10, wherein the optical ring resonator is a rigid optical waveguide resonator.

17. A method for measuring rotation, the method comprising:
propagating the optical pump beam through an optical ring resonator in a first direction;
stimulating, from the optical pump beam, a first order stimulated Brillouin scattering (SBS) beam at a first frequency that is down-shifted from the pump frequency by a Brillouin Stokes frequency;
propagating the first order SBS beam through the optical ring resonator in a second direction that is opposite the first direction,
stimulating, from the first order SBS beam, a second order SBS beam at a second frequency that is down-shifted from the pump frequency by twice the Brillouin Stokes frequency; and
propagating the second order SBS beam in the first direction;
outputting the second order SBS beam and the pump beam from the optical ring resonator;
outputting the first order SBS beam from the optical ring resonator;
generating a beat signal between the first order SBS beam and the second order SBS beam at a beat detector; and
determining a rate of rotation based on the beat signal.

18. The method of claim 17, further comprising:
generating a reference frequency signal based on two co-propagating beams being incident on an optical clock detector.

19. The method of claim 17, further comprising:
separating the second order SBS beam from the pump beam by a pump rejection filter.

20. The method of claim 17, further comprising:
coupling the second order SBS beam from the pump rejection filter to co-propagate with the first order SBS beam; and
guiding the co-propagating the first order SBS beam and the second order SBS beam to be incident on the beat detector.

* * * * *